US006329801B1

(12) United States Patent
Zuniga et al.

(10) Patent No.: US 6,329,801 B1
(45) Date of Patent: Dec. 11, 2001

(54) SWITCHING REGULATOR CONTROL SYSTEM AND METHOD

(75) Inventors: Marco A. Zuniga, Dublin; Charles Nickel, San Jose; David B. Lidsky; Anthony J. Stratakos, both of Fremont, all of CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 0 days.

(21) Appl. No.: 09/558,407

(22) Filed: Apr. 24, 2000

(51) Int. Cl.[7] .................................................. G05F 1/40
(52) U.S. Cl. ............................................. 323/285; 323/282
(58) Field of Search ..................................... 323/285, 282, 323/284, 286, 290, 224, 283; 363/21, 41

(56) References Cited

U.S. PATENT DOCUMENTS

| 5,481,178 | 1/1996 | Wilcox et al. ..................... 323/287 |
| 5,912,552 * | 6/1999 | Tateishi ............................... 323/285 |
| 5,989,871 * | 8/1999 | Tanaka ................................. 323/285 |
| 6,178,101 | 1/2001 | Shires .................................. 363/39 |

* cited by examiner

Primary Examiner—Rajnikant Patel
(74) Attorney, Agent, or Firm—Fish & Richardson PC

(57) ABSTRACT

A voltage regulator with an input terminal to be coupled to an input voltage source and an output terminal to be coupled to a load. The voltage regulator has a first switch to intermittently couple the output terminal to the input terminal, a voltage sensor to detect a voltage at the output terminal, a current sensor to detect a current flowing along a circuit path between the input terminal and the output terminal, and a controller connected to the switch, the voltage sensor and the current sensor. The controller is configured to close the first switch if the voltage is less than a first threshold voltage and the current is less than a first threshold current, and the controller is configured to open the first switch if the voltage is greater than a second threshold voltage and the current is greater than a second threshold current.

21 Claims, 7 Drawing Sheets

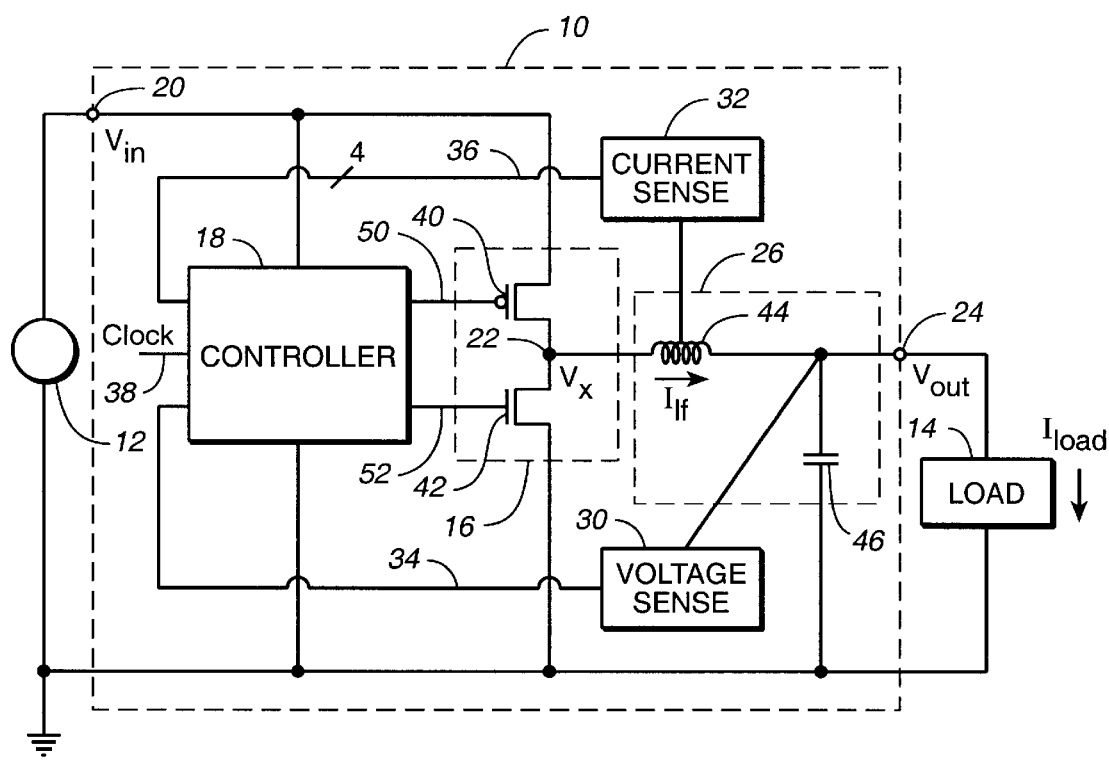
FIG._1

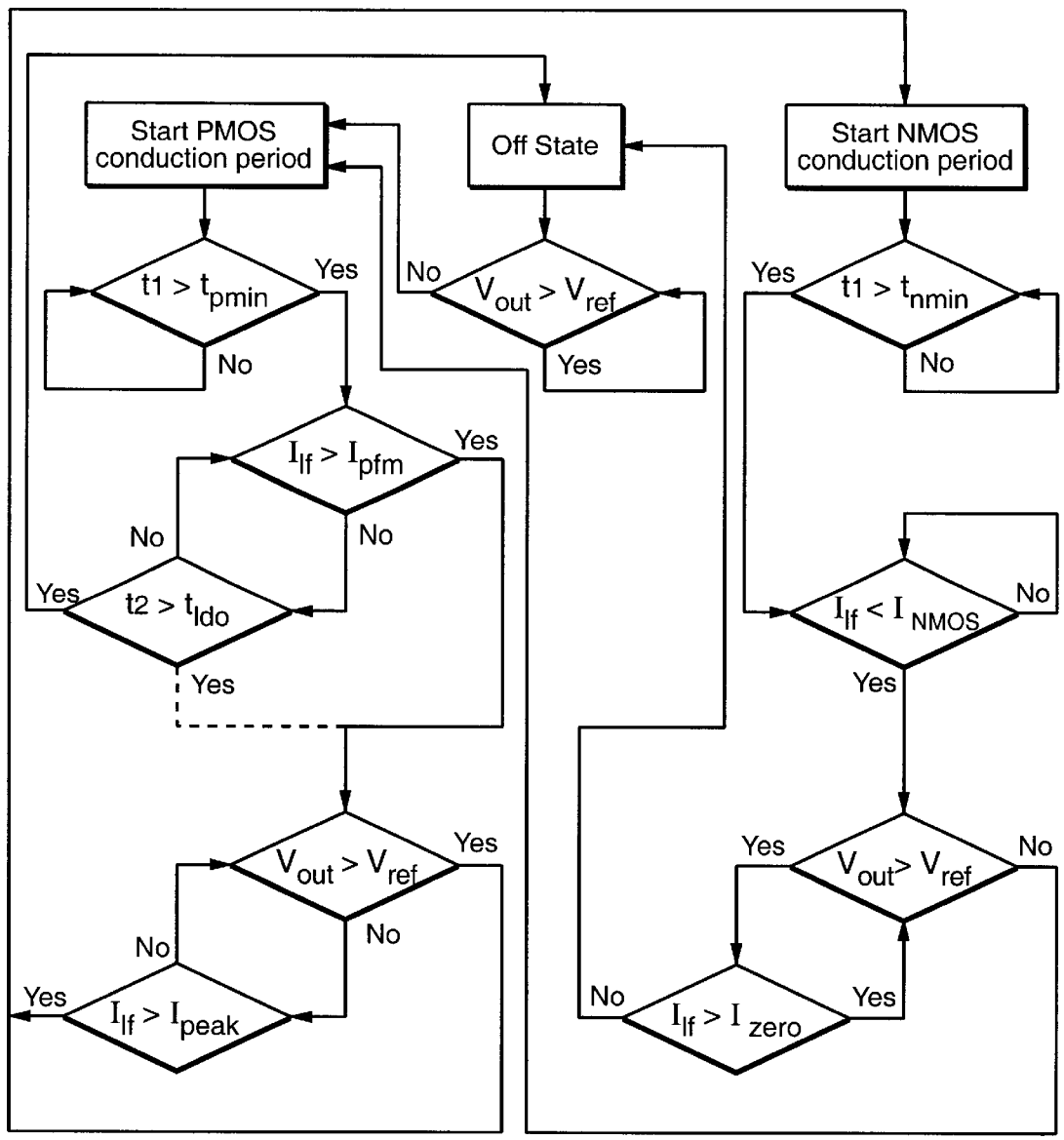
FIG._2

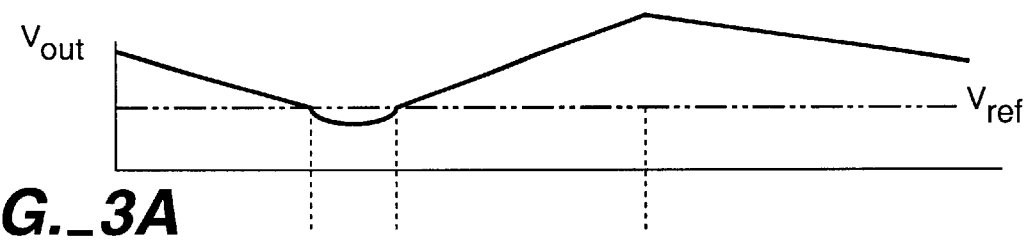
FIG._3A
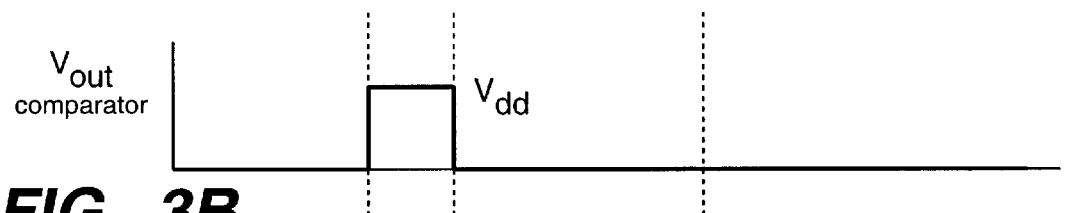
FIG._3B
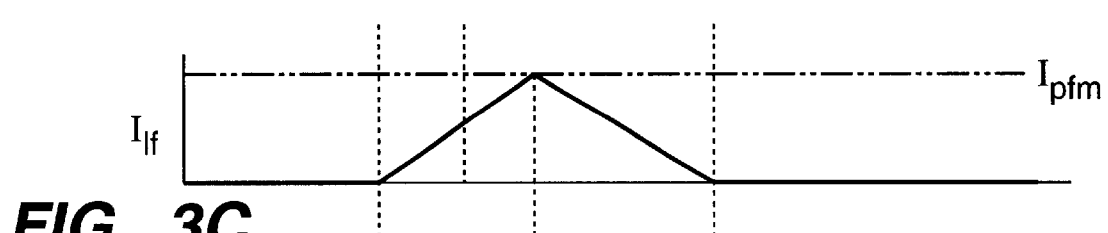
FIG._3C
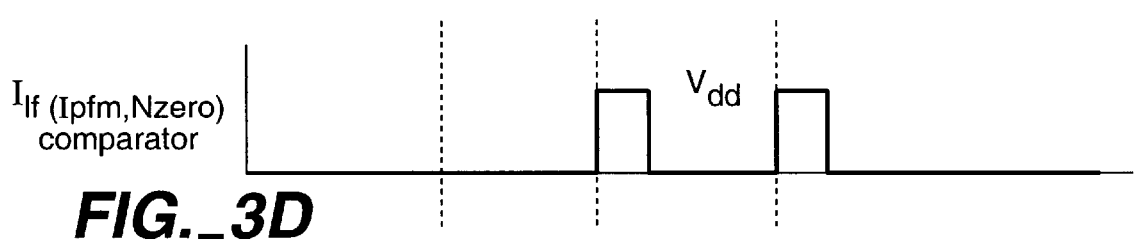
FIG._3D
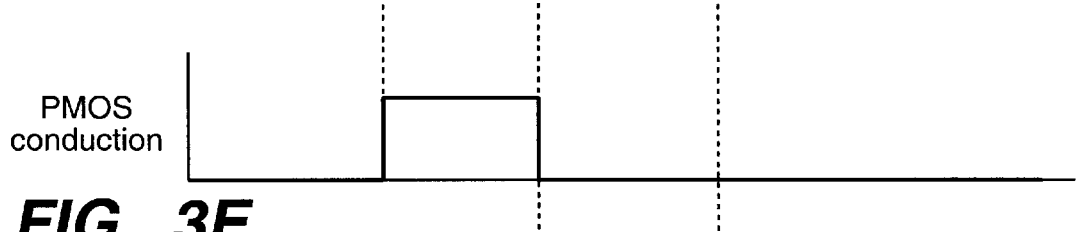
FIG._3E
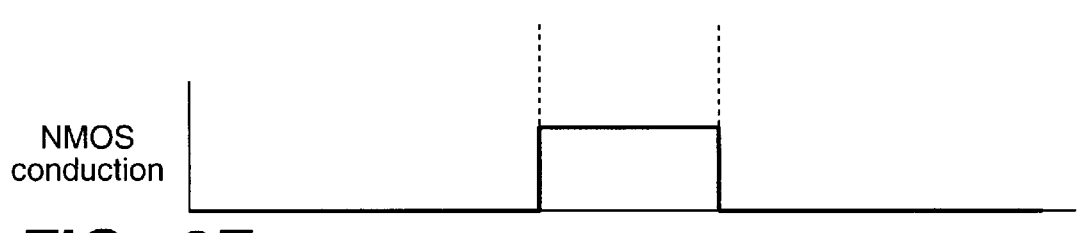
FIG._3F

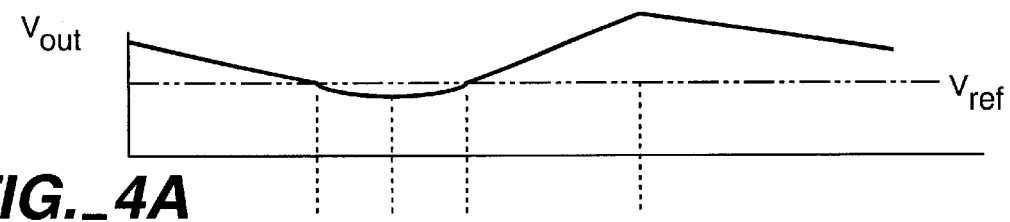
*FIG._4A*
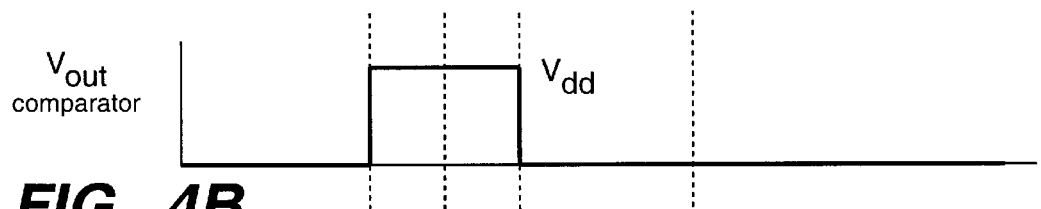
*FIG._4B*
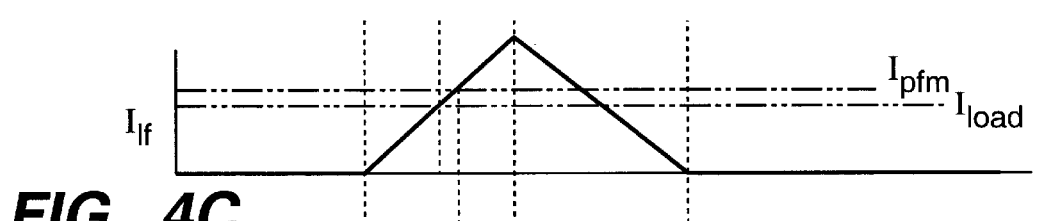
*FIG._4C*
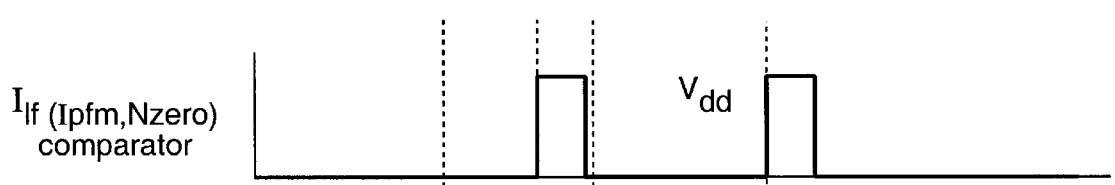
*FIG._4D*
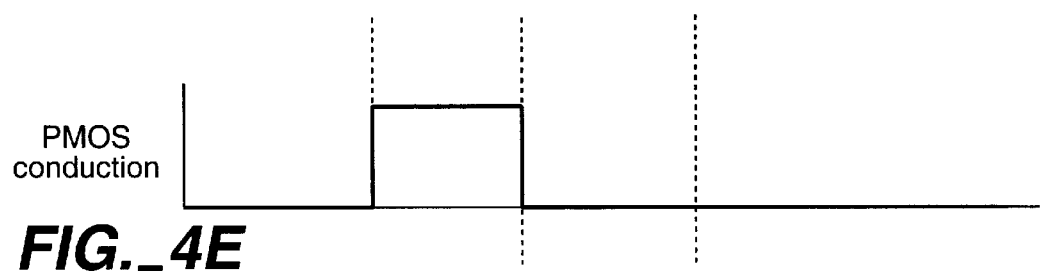
*FIG._4E*
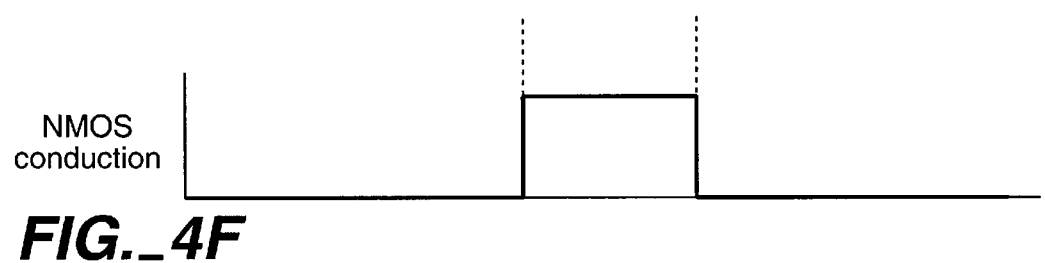
*FIG._4F*

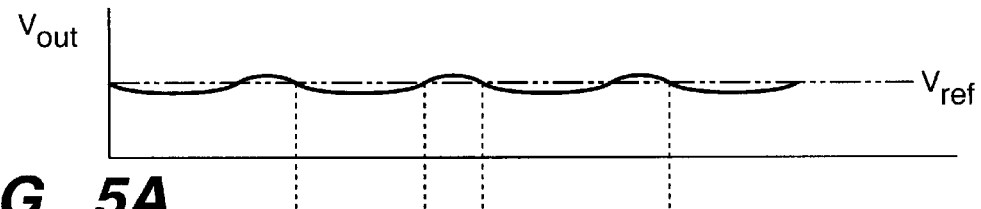
FIG._5A
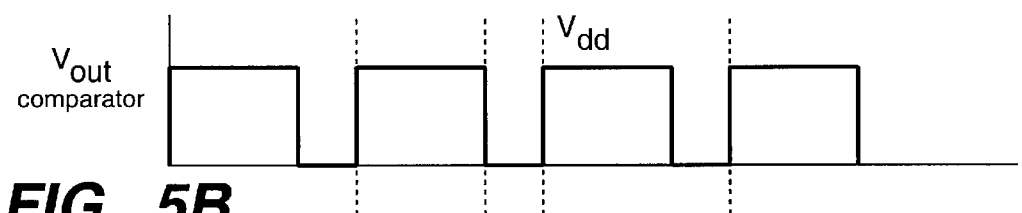
FIG._5B
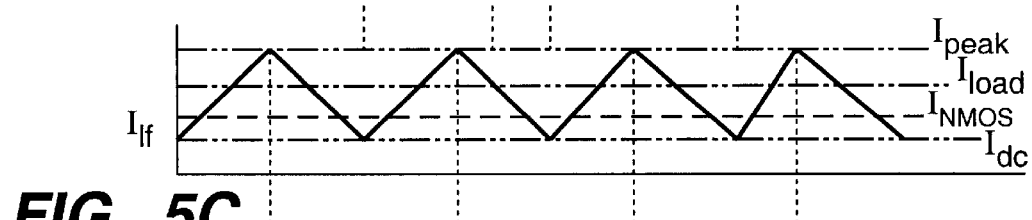
FIG._5C
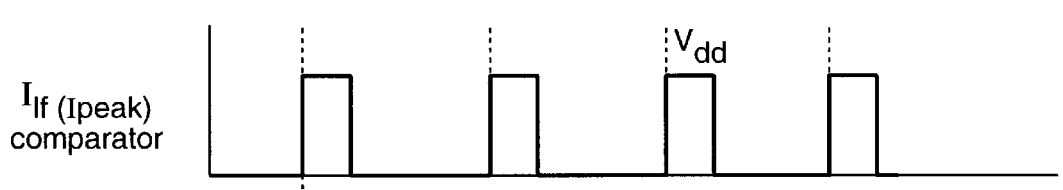
FIG._5D
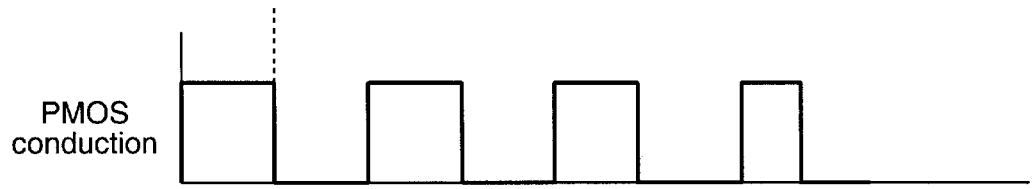
FIG._5E
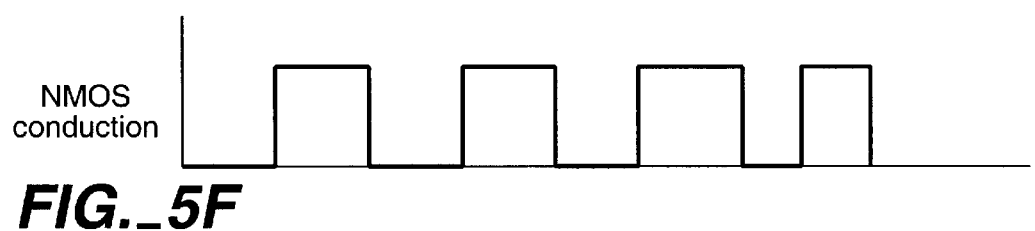
FIG._5F

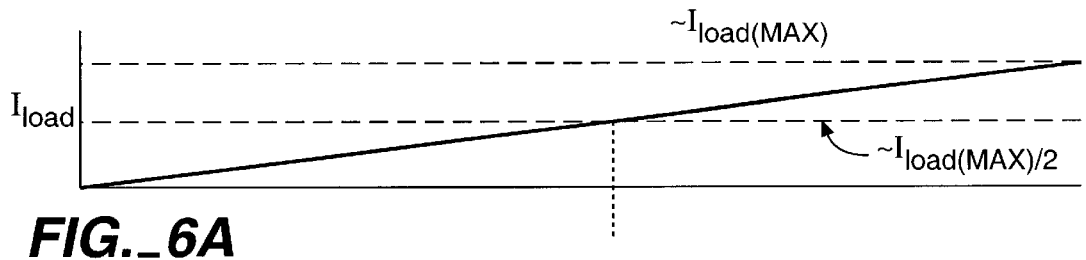
FIG._6A
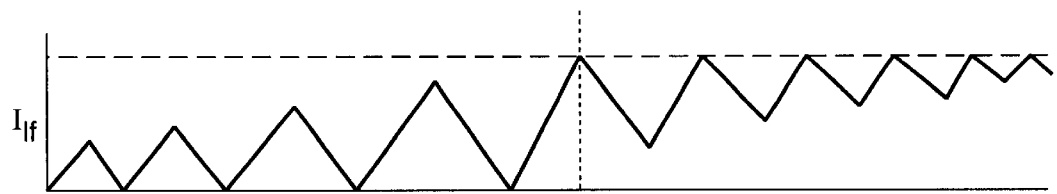
FIG._6B
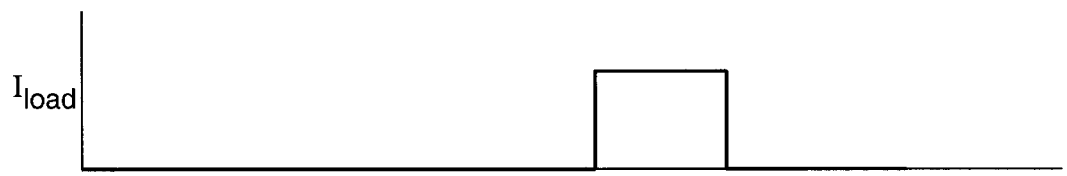
FIG._7A
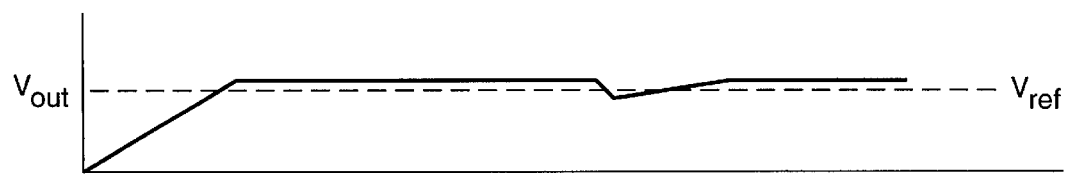
FIG._7B
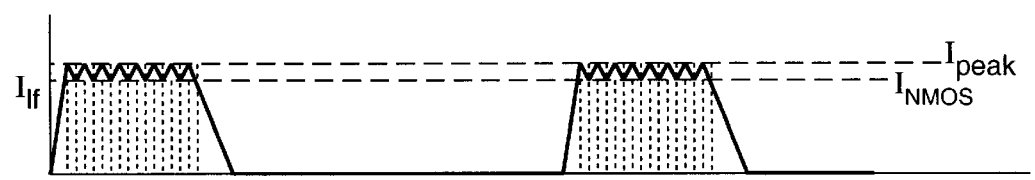
FIG._7C

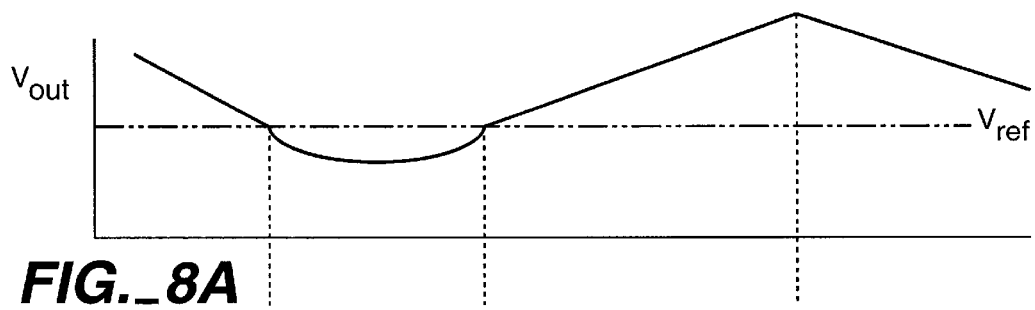
*FIG._8A*
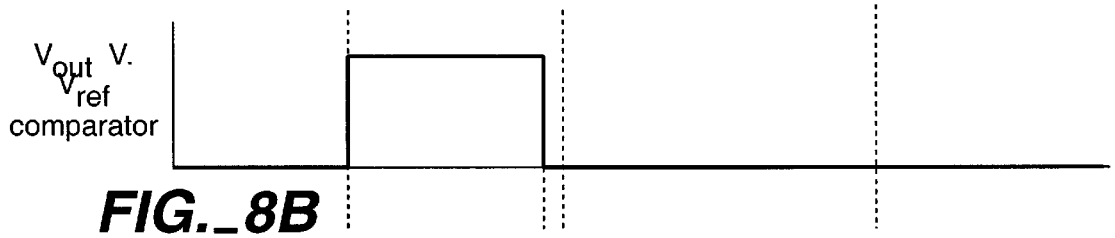
*FIG._8B*
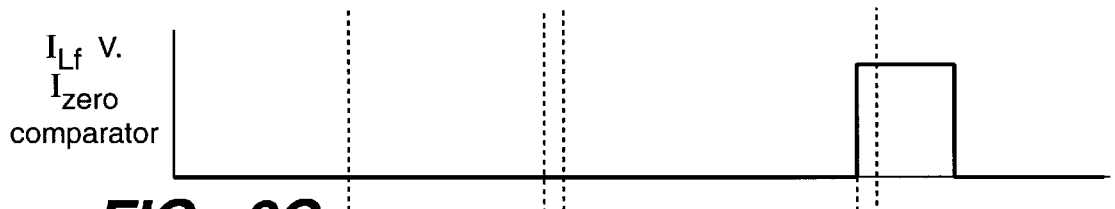
*FIG._8C*
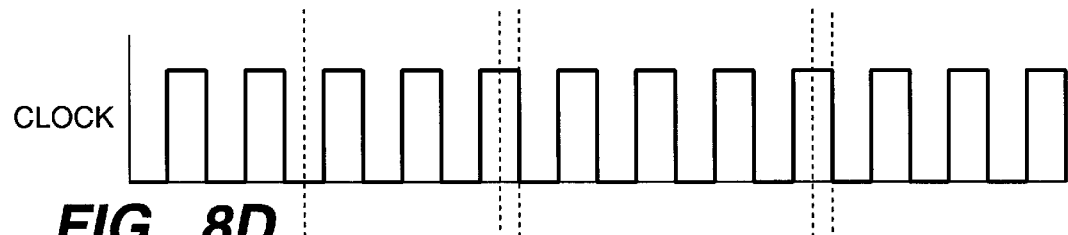
*FIG._8D*
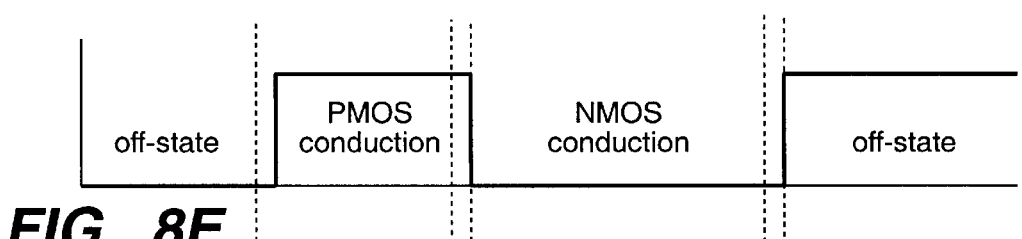
*FIG._8E*
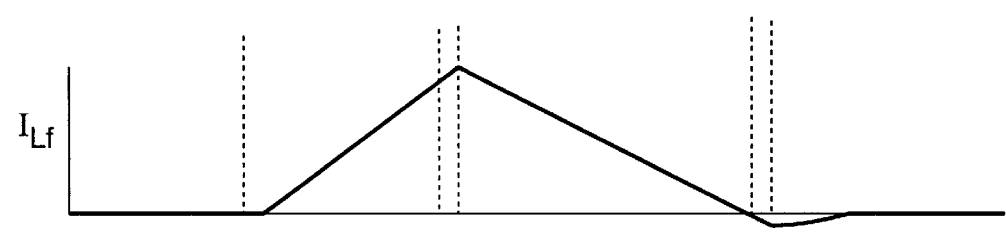
*FIG._8F*

SWITCHING REGULATOR CONTROL SYSTEM AND METHOD

BACKGROUND

The present invention relates generally to voltage regulators, and more particularly to control systems for switching voltage regulators.

Voltage regulators, such as DC to DC converters, are used to provide stable voltage sources for electronic systems. Efficient DC to DC converters are particularly needed for battery management in low power devices, such as laptop notebooks and cellular phones. Switching voltage regulators (or more simply "switching regulators") are known to be an efficient type of DC to DC converter. A switching regulator generates an output voltage by converting an input DC voltage into a high frequency voltage, and filtering the high frequency voltage to generate the output DC voltage. Typically, the switching regulator includes a switch for alternately coupling and de-coupling an input DC voltage source, such as a battery, to a load, such as an integrated circuit. An output filter, typically including an inductor and a capacitor, is coupled between the input voltage source and the load to filter the output of the switch and thus provide the output DC voltage. A controller measures an electrical characteristic of the circuit, e.g., the voltage or current passing through the load, and sets the duty cycle of the switch in order to maintain the output DC voltage at a substantially uniform level.

Voltage regulators for microprocessors are subject to ever more stringent performance requirements. One trend is to operate at higher currents, e.g., 35–50 amps. Another trend is to turn on or off different parts of the microprocessor in each cycle in order to conserve power. This requires that the voltage regulator react very quickly to changes in the load, e.g., several nanoseconds to shift from the minimum to the maximum load. Another trend is to require the voltage regulator to have a "standby mode" which consumes little power at low loads. In addition to these specific trends, high efficiency is generally desirable in order to avoid thermal overload at high loads and to increase battery life in portable systems.

Unfortunately, some conventional voltage regulators operate well at either large or small loads, but not both. In addition, some buck regulators do not function properly when the output voltage is comparable to the input voltage. Other problems that occur in voltage regulators include the following: large ripple current losses, voltage overshooting during start-up and quickly changing load conditions, and electrical noise from the opening and closing of the power switches in the regulator.

Conventional controllers often employ analog control and design techniques to achieve voltage regulation. Such techniques often result in implementations of comparatively large die area and design complexity. Moreover, such implementations are not easily integrated into larger systems or ported among different processing technologies.

In view of the foregoing, there is room for improvement in voltage regulators and control systems for voltage regulators.

SUMMARY

In one aspect, the invention is directed to a voltage regulator having an input terminal to be coupled to an input voltage source and an output terminal to be coupled to a load. The voltage regulator has a first switch to intermittently couple the output terminal to the input terminal, a voltage sensor to detect a voltage at the output terminal, a current sensor to detect a current flowing along a circuit path between the input terminal and the output terminal and a controller connected to the switch, the voltage sensor and the current sensor. The controller is configured to close the first switch if the voltage is less than a first threshold voltage and the current is less than a first threshold current, and the controller is configured to open the first switch if the voltage is greater than a second threshold voltage and the current is greater than a second threshold current.

Implementations of the invention may include one or more of the following features. The first threshold current may be greater than the second threshold current, and the first threshold voltage may be equal to the second threshold voltage. The controller may receive a clock signal from an external clock, and the controller may be configured to delay switching of the first switch until a clock boundary on the external clock. A second switch may intermittently couple the output terminal to ground. The controller may be configured to open the second switch if the first switch closes or the current is less than a third threshold current (e.g., about zero current). The controller may be configured to open the first switch and close the second switch if the first switch has been open for longer than a first duration and the voltage exceeds the second threshold voltage. The controller may be configured to open the first switch if the current is greater than a fourth threshold current. The fourth threshold current may be approximately equal to a nominal maximum load current plus a ripple current. The controller may be configured to close the first switch for a minimum first duration. A filter may be positioned in the circuit path between the input terminal and the output terminal. The filter may include an inductor coupling the intermediate terminal to the output terminal, and a capacitor coupling the output terminal to ground.

In another aspect, the invention is directed to a voltage regulator having an input terminal to be coupled to an input voltage source and an output terminal to be coupled to a load. The voltage regulator has a first switch to intermittently couple the output terminal to the input terminal, a voltage sensor to detect a voltage at the output terminal, a current sensor to detect a current flowing along a circuit path, and a controller connected to the switch, the voltage sensor and the current sensor. The controller may be configured to close the first switch if the voltage is less than a first threshold voltage and the current is less than a first threshold current, and the controller is configured to open the first switch if the voltage is greater than the first threshold voltage and the current is greater than a second threshold current, the first threshold current being greater than the second threshold current.

In another aspect, the invention is directed to a voltage regulator that has an input terminal to be coupled to an input voltage source, an output terminal to be coupled to a load, a first switch to intermittently couple the output terminal to the input terminal, a voltage sensor to detect a voltage at the output terminal, a current sensor to detect a current flowing along the circuit path, and a controller connected to the switch, the voltage sensor and the current sensor. The controller is configured to direct current pulses of a fixed amplitude to the output terminal if the current load is less than a first threshold, to direct current pulses of increasing amplitude to the output terminal if the current load is between the first threshold and a second threshold, and to permit current to flow continuously to the output terminal if the current load is greater than the second threshold.

In another aspect, the invention is directed to a method of operating a voltage regulator having an input terminal to be coupled to an input voltage source and an output terminal to be coupled to a load. In the method, a voltage at the output terminal is determined, a current flowing through a circuit path between the input terminal and the output terminal is determined, a switch is closed to electrically couple the output input terminal to the input terminal if the voltage is less than a first threshold voltage and the current is less than a first threshold current, and the switch is opened if the voltage is greater than a second threshold voltage and the current is greater than a second threshold current.

Implementations of the invention may include one or more of the following features. The first threshold current may be greater than the second threshold current. The first threshold voltage may be equal to the second threshold voltage.

Advantages of the invention can include the following. The voltage regulator can be optimized for both large and small load conditions. The voltage regulator can provide reduced voltage ripple and improved transient response. Switching events can be synchronized with an external clock to reduce noise-related performance degradation. The controller for the voltage regulator can be both compact and robust. The controller operates with a digital control algorithm in which the operating parameters can be modified to adapt the voltage regulator for different applications. The digital control algorithm can operate at clock frequency significantly higher than the switching frequency, allowing quick response to changes in the load.

Other features and advantages of the invention will become apparent from the following description, including the drawings and the claims.

BRIEF DESCRIPTION OF THE DRAWINGS

FIG. 1 is a block diagram of a switching regulator in accordance with the present invention.

FIG. 2 is a flowchart illustrating a method performed by the switching regulator.

FIGS. 3A–3F are timing diagrams illustrating the operation of the switching regulator at light load conditions.

FIGS. 4A–4F are timing diagrams illustrating the operation of the switching regulator at light moderate conditions.

FIGS. 5A–5F are timing diagrams illustrating the operation of the switching regulator at heavy load conditions.

FIGS. 6A–6B are timing diagrams illustrating the operation of the switching regulator under a linearly increasing load.

FIGS. 7A–7C are timing diagrams illustrating the operation of the switching regulator at start-up and under transient loads.

FIGS. 8A–8F are timing diagrams illustrating the operation of the switching regulator to synchronize switching of the PMOS and NMOS transistors with a signal from an external clock.

DETAILED DESCRIPTION

Referring to FIG. 1, a switching regulator 10 is coupled to a DC input voltage source 12, such as a battery, by an input terminal 20. The switching regulator 10 is also coupled to a load 14, such as an integrated circuit, by an output terminal 24. The switching regulator 10 serves as a DC-to-DC converter between the input terminal 20 and the output terminal 24. The switching regulator 10 includes a switching circuit 16 which serves as a power switch for alternately coupling and decoupling the input terminal 20 to an intermediate terminal 22. The switching circuit 16 includes a rectifier, such as a switch or diode, coupling the intermediate terminal 22 to ground. The opening and closing of the switching circuit 16 generates an intermediate voltage $V_{int}$ having a rectangular waveform at the intermediate terminal 22. An output filter 26 converts the rectangular waveform of the intermediate voltage at the intermediate terminal 22 into a substantially DC output voltage at the output terminal 24.

As illustrated, the switching circuit 16 and the output filter 26 can be configured in a buck converter topology, although the invention is also applicable to other voltage regulator topologies, such as boost converter or buck-boost converter topologies. The switching circuit can include a first transistor 40 having a source connected to the input terminal 20 and a drain connected to the intermediate terminal 22 and a second transistor 42 having a source connected to ground and a drain connected to the intermediate terminal 22. The first transistor 40 can be a P-type MOS (PMOS) device, whereas the second transistor 42 can be an N-type MOS (NMOS) device. In a buck-converter topology, the output filter 26 includes an inductor 44 connected between the intermediate terminal 22 and the output terminal 24 and a capacitor 46 connected in parallel with the load 14. During a PMOS conduction period, the voltage source 12 supplies energy to the load 14 and the inductor 44 via the first transistor 40. On the other hand, during an NMOS conduction period, the second transistor 42 is closed, and current flows through the second transistor 42 as energy is supplied by the inductor 44. The resulting output voltage $V_{out}$ is a substantially DC voltage.

The switching regulator includes a master controller 18 for controlling the operation of the switching circuit 16 to maintain the output voltage $V_{out}$ at a substantially constant level. The master controller 18 generates control signals on timing lines 50 and 52 to control the transistors 40 and 42. Alternatively, the master controller 18 can generate one or more digital state control signals which are interpreted by an on-chip interpreter to generate the control signals. The switching state, i.e., PMOS transistor 30 closed and NMOS transistor 32 open (a PMOS conduction period), NMOS transistor 32 closed and PMOS transistor 30 open (an NMOS conduction period), or both PMOS transistor 30 and NMOS transistor 32 open (an off state) is set so as to maintain the output voltage $V_{out}$ at the output terminal 22 substantially within a voltage tolerance $\Delta V_{nom}$ of the nominal voltage $V_{nom}$.

A voltage sense circuit 30 measures the voltage the output voltage $V_{out}$ at the output terminal 24, and sends a signal representative of $V_{out}$ to the controller 18. In one implementation, the voltage sense circuit 30 can compare the output voltage $V_{out}$ to a reference voltage $V_{ref}$ which represents the desired voltage for the output terminal. If the output voltage $V_{out}$ exceeds the reference voltage $V_{ref}$, a high signal can be output to the controller 18 on a voltage signal line 34. Alternatively, the output voltage can be measured by the voltage sensing circuit 30, and the comparison can be performed in the controller 18.

The switching regulator also includes a current sense circuit 32 to measure the current $I_{if}$ passing through the inductor 44 and send a signal representative of $I_{if}$ to the controller 18. In one implementation, the current sense circuit 32 compares the inductor current $I_{if}$ to several current limits, including $I_{zero}$, $I_{pfm}$, $I_{NMOS}$ and $I_{peak}$ discussed below. If the inductor current $I_{if}$ exceeds one or more of the current limits, a high signal can be output to the controller 18 on one of several, e.g., four, current signal lines 36. Alternatively, the inductor current can be measured by the current sense circuit 32, and the comparison can be performed in the controller 18.

In brief, the controller 18 implements a digital voltage and current-based control algorithm. Based on the feedback from the current sense circuit 32 and voltage sense circuit 30, the control algorithm in the master controller 18 determines the state for the switching circuit 16 to maintain the output voltage $V_{out}$ at a substantially constant level. More particularly, the master controller 18 ensures that the current flowing out of the switching regulator 10 matches the current flowing into the load 14, thereby maintaining the output voltage at a substantially constant level. For example, if the current load (or simply "load") increases, then the amount of current passing through the slaves is increased. This permits the current to "ramp up" until the desired load is reached. On the other hand if the load decreases, the amount of current passing through the active switching regulator is decreased. This permits the current to "ramp down" until the desired load is achieved. The master controller 18 can be powered by the voltage source 12 (as illustrated) or by another voltage source.

The master controller 18, switching circuit 16 and sense circuits 30 and 32 can be constructed utilizing mostly digital and analog relay based components. Thus, most of the switching regulator 10 could be implemented or fabricated on a single chip utilizing conventional CMOS techniques. Thus, the controller can be integrated with a larger system on a chip (SOC) design. Alternatively, each switching circuit can be fabricated on an individual chip with associated sense circuits, and the master controller 18 can be fabricated on a separate chip.

In applications which require time domain noise control, switching events can be synchronized with an external clock. To perform synchronization, the master controller 18 also receives a clock signal 38 from an external clock. The clock signal 38 can be generated by the same clock that runs the microprocessor, by other IC devices in the load, or by a clock on the master controller chip. The clock frequency $f_{clock}$ should be significantly larger than the switching frequency $f_{switch}$ of the switching circuit 16, e.g., by a factor of ten or more, to ensure quick response to changes in the load. However, the clock frequency $f_{clock}$ should not be so high that the switching regulator and master controller constitute a large drain on the voltage source. Typically, the clock frequency $f_{clock}$ does not need to be as high as the microprocessor clock speed, and can be generated by dividing down the microprocessor clock signal.

The master controller also includes two timers. One timer $t_1$ is triggered when the switching circuit 16 initiates either a PMOS or NMOS conduction period. The timer is reset at each new conduction period (whether PMOS or NMOS). A second timer t2 is also triggered the switching circuit 16 initiates a PMOS conduction period. The minimum and maximum durations of the PMOS conduction cycle are controlled by the timers t1 and t2, respectively.

Referring to FIG. 2, each clock cycle $T_{clock}$, e.g., about every 50 nanoseconds if the clock frequency $f_{clock}$ is about 20 MHz, the master controller 18 performs a digital control method to determine whether close the PMOS transistor ($P_{on}$), open the PMOS transistor ($P_{off}$), close the NMOS transistor ($N_{on}$), and the NMOS transistor ($N_{off}$). Of course, the ordering of the steps shown in FIG. 2 is exemplary, and the steps could be performed in parallel or in another order.

The digital control algorithm can be expressed by the following Boolean logic expressions:

$P_{on}$ if: ($V_{out}$<$V_{ref}$) and ($t_1$>$t_{Nmin}$) and ($I_{lf}$<$I_{NMOS}$)
$P_{off}$ if: ($t_1$>$t_{pmin}$) and [($I_{lf}$>$I_{peak}$) or ($V_{out}$>$V_{ref}$)] and [($t_2$>$t_{ldo}$) or ($I_{lf}$>$I_{pfm}$)]
$N_{on}$ if: $P_{off}$ and ($t_2$<$t_{ldo}$)
$N_{off}$ if: $P_{on}$ or (I<$I_{zero}$)
with
$I_{zero}$<$I_{pfm}$<$I_{NMOS}$<$I_{peak}$ where $V_{out}$ is the measured output voltage, $V_{ref}$ is the desired output voltage, t1 and t2 are the times measured by the timers in the master controller 18, $t_{Nmin}$ is a minimum NMOS conduction period, $t_{Pmin}$ is a minimum PMOS conduction period, $t_{ldo}$ is a maximum PMOS conduction period, $I_{lf}$ is the measured or estimated current flowing through the inductor, $I_{NMOS}$ is a short circuit current limit, $I_{peak}$ is a maximum current for the switching regulator, $I_{pfm}$ is a current limit to control operation of the switching circuit and approximate a pulse frequency modulation mode, and $I_{zero}$ is a current limit that represent "ground" for the inductor. Typical values for the constants used in the algorithm can be a $V_{ref}$ of about 1.8 volts, a $t_{Nmin}$ of about 100 ns, a $t_{Pmin}$ of about 100 ns, a $t_{ldo}$ of about 18 microseconds, $I_{NMOS}$ of about $I_{loadmax}$−½Δ$I_{ripple}$, a $I_{peak}$ of about $I_{loadmax}$+½Δ$I_{ripple}$ and an $I_{pfm}$ of about 120 milliamperes. $I_{loadmax}$ is the desired average output current when the switching regulator is operating under maximum load, e.g., the nominal maximum current for the load. Typical values of Δ$I_{ripple}$ can be about 10–20% of the nominal maximum current $I_{loadmax}$.

The operation of the voltage regulator under various load conditions will be discussed below.

As shown in FIGS. 3A–3F, under light load conditions, the voltage regulator 10 operates much light a traditional pulse frequency modulator (PFM). As illustrated, the PMOS switch 40 is closed when the output voltage $V_{out}$ falls below the reference voltage $V_{ref}$. The PMOS switch 40 then stays closed until the inductor current $I_{lf}$ rises to reach the PFM operation current threshold $I_{pfm}$. It should be noted that in these light load conditions, once the PMOS transistor 40 is closed, the output voltage $V_{out}$ will exceed the reference voltage $V_{ref}$ before the inductor current $I_{lf}$ exceeds the current threshold $I_{pfm}$. Once the inductor current $I_{lf}$ reaches the PFM operation current threshold $I_{pfm}$, the PMOS transistor 40 is opened and the NMOS transistor 42 is closed to discharge the inductor. However, because the current remains positive as the inductor is discharged, the output voltage $V_{out}$ will continue to increase. Once the inductor current $I_{lf}$ reaches zero, the NMOS transistor 42 is opened (and the PMOS transistor 42 is left open). The output voltage is then slowly discharged either by the load or through parasitic current paths. Thus, the output voltage $V_{out}$ will gradually decrease until it reaches $V_{ref}$, at which point the cycle is repeated. The resulting switch operation is a pulse frequency modulation, with each pulse ramping up to a maximum current $I_{pfm}$ and then ramping down to zero, and with the pulse frequency increasing as the load increases. The resulting ripple in the output voltage $V_{out}$ is given by the following equation:

$$V_{ripple} = \frac{1}{2} I_{pfm^*}^2 \frac{L}{C}\left(\frac{1}{V_{in} - V_{ref}} + \frac{1}{V_{ref}}\right)$$

with $I_{pfm^*}$ calculated as follows:

$$I_{pfm^*} = \left[I_{pfm} + I_{td2}\left(\frac{V_{in} - V_{out}}{L}\right)\right]$$

where td2 is the delay as the signal passing through the current comparator. The light load switching frequency and output voltage ripple are inversely proportional to $I_{pfm}$. The value can be selected to maximize light load efficiency while maintaining the required output voltage ripple specification.

As shown in FIGS. 3A–3F, under conditions of medium load (i.e., the inductor current $I_{lf}$ exceeds the current threshold $I_{pfm}$ but does not reach $I_{peak}$ before the output voltage $V_{out}$ exceeds the reference voltage $V_{ref}$), as the load increases, the size of the current pulses begins to grow. As illustrated, the PMOS switch 40 is closed when the output voltage $V_{out}$ falls below the reference voltage $V_{ref}$. The PMOS switch 40 then stays closed until the reference voltage $V_{out}$ exceeds the reference voltage $V_{ref}$. Then the PMOS transistor 40 is opened and the NMOS transistor 42 is closed to discharge the inductor. However, because the current remains positive as the inductor is discharged, the output voltage $V_{out}$ will continue to increase. If the inductor current $I_{lf}$ reaches zero, the NMOS transistor 42 is opened (and the PMOS transistor 42 is left open), and the inductor discharges through parasitic effects until the output voltage $V_{out}$ reaches the reference voltage $V_{ref}$, at which point the cycle is repeated. It may be noted that if the output voltage $V_{out}$ falls below the reference voltage $V_{ref}$ before the inductor current $I_{lf}$ reaches zero, the switching regulator is operating under a heavy load condition.

The resulting switch operation for medium loads causes the PMOS conduction period to increase as the load increases, thereby increasing the size of the current pulses. The resulting ripple in the output voltage $V_{out}$ is given by the following equation:

$$V_{ripple} = \frac{1}{2}\left[\left(I_{pfm}^2 + \frac{2C\Delta V(V_{in}-V_{ref})}{L}\right) + 2t_{d2}\left(\frac{V_{in}-V_{out}}{L}\right)\sqrt{I_{pfm}^2 + \frac{2C\Delta V(V_{in}-V_{ref})}{L}}\right]\left[\frac{L}{C}\left(\frac{1}{V_{in}-V_{ref}} + \frac{1}{V_{ref}}\right)\right]$$

where $\Delta V$ and $t_{d2}$ are the hysterisis and delay through the voltage comparator, respectively. As can be seen from this equation, the comparator hysterisis results in an output voltage ripple, which is magnified by the ratio of $V_{in}$ to $V_{out}$. Thus, both the delay and hysterisis should be minimized to reduce the output voltage ripple.

As shown in FIGS. 5A–5F, under conditions of heavy load (e.g., the inductor current $I_{lf}$ reaches $I_{peak}$ before the output voltage $V_{out}$ exceeds the reference voltage $V_{ref}$), the switching regulator permits a DC component of the load current $I_{lf}$ to flow through the inductor. As illustrated, the PMOS switch 40 is closed and the NMOS switch 42 is opened when the output voltage $V_{out}$ falls below the reference voltage $V_{ref}$. The PMOS switch 40 stays closed until the inductor current $I_{lf}$ reaches the peak inductor current $I_{peak}$. Once the inductor current $I_{lf}$ reaches the peak inductor current $I_{peak}$, the PMOS transistor 40 is opened and the NMOS transistor 42 is closed to discharge the inductor. The output voltage will increase until exceeds the reference voltage $V_{ref}$, and then begin to fall. When the output voltage $V_{out}$ falls below the reference voltage $V_{ref}$, the NMOS transistor 42 is opened and the PMOS transistor 42 is closed, repeating the cycle. The minimum current which the inductor current reaches before the PMOS transistor is closed represents a DC offset current $I_{DC}$.

The resulting switch operation causes the PMOS and NMOS conduction periods to decrease as the load increases, thereby increasing the offset current $I_{DC}$. The steady state behavior of the regulator is a function of the non-ideal aspects (e.g., the delay through the voltage comparator) of the sense circuitry and filter components. An estimate of the ripple in the output voltage $V_{out}$ is given by the following equation:

$$V_{ripple} = \frac{(I_{peak}-I)^2 V_{dd} L}{2C(V_{in}-V_{ref})V_{ref}}$$

The peak current Ipeak can be determined from the following equation:

$$I_{peak} = I_{limit1} + t_{d2}\left(\frac{V_{in}-V_{ref}}{L}\right)$$

A linearly increasing load current will cause the controller to traverse the light, medium and heavy current operation modes. Depending on the ramp-up rate of the load current, the behavior of the switching regulator as the load increases linearly from zero to the maximum current $I_{max}$ and the resulting inductor current is illustrated in FIGS. 6A and 6B.

The control algorithm implements a minimum PMOS conduction period $T_{Pmin}$ and a minimum NMOS conduction period $T_{Nmin}$. When the PMOS transistor 40 or NMOS transistor 42 is closed, the master controller 16 starts a timer $t_1$. The master controller does not permit the closed transistor 40 or 42 to open until the minimum conduction period $T_{Pmin}$ or $T_{Nmin}$, respectively, has expired. The minimum conduction periods are equal to or greater than the time required to dampen the voltage transients on the power rails that are induced by the switching. This minimizes the effects of noise on analog sense circuitry and reduces false triggers.

The control algorithm requires that once the inductor current reaches the maximum current $I_{peak}$, the NMOS transistor 40 remain closed so that the inductor can discharge until the inductor current falls below a short circuit current limit $I_{NMOS}$. Thus, as shown in FIGS. 7A–7C, in sudden changes to heavy load conditions, the system essentially acts as a current source of value $(I_{peak}+I_{NMOS})/2$ to charge the output capacitor. As can be seen from FIG. 7C, since the inductor will discharge at a constant rate when the NMOS transistor 40 is closed, the closer $I_{peak}$ is to $I_{NMOS}$, the less time it will take to switch back to a PMOS conduction period. Consequently, the maximum switching frequency (and thus maximum efficiency) of the regulator under these high load conditions is inversely proportional to $\Delta I_{ripple}$. On the other hand, the output voltage ripple is proportional to $\Delta I_{ripple}$. Therefore, $\Delta I_{ripple}$ is chosen to provide a balance between output voltage ripple and power efficiency. As noted above, typical values of $\Delta I_{ripple}$ can be about 10–20% of the nominal maximum current $I_{loadmax}$, and can be selected based on the expected losses in the load.

Causing the system to act as a current source provides over-current protection during the transient response during startup and step loads. In addition, by allowing the inductor current to increase continuously to its maximum value, the output capacitance required to support the output voltage is minimized. Thus, this control approach is useful to minimize the form factor of the external filter components.

When the output voltage $V_{out}$ is approximately equal to the input voltage $V_{in}$, the current during the PMOS conduction period can not approximated by a linear function. Thus, the load current $I_{lf}$ can begin to decrease before the pulse width modulation current boundary $I_{pfm}$ is reached. To compensate for this possibility, the master controller 18 includes a maximum PMOS conduction period $t_{ldo}$. Depending on the implementation of the sense circuitry, this maximum conduction period can be utilized to turn off the PMOS transistor and discharge the inductor current through the parasitic diodes in the system. Specifically, when the maximum PMOS conduction period $t_{ldo}$ expires, the switching circuit enters the off-state, with both the PMOS transistor 40 and NMOS transistor 42 open. This provides a "softer" switching event, and reduces the noise introduced into the system. Alternatively, as shown by the phantom line in FIG. 2, when the maximum PMOS conduction period $t_{ldo}$ expires, control can be passed back to the voltage comparator, enabling the system to act like a low dropout regulator (LDO).

As described above, the master controller 18 functions in an asynchronous fashion. However, for some applications, master controller can set the current switching events so as not to conflict with noise sensitive circuit operations. In this implementation, the timing of the opening and closing of the transistors 40 and 42 is synchronized with the external clock signal 66. Specifically, as shown in FIGS. 8A–8F, each switching events can be delayed until the clock edge after the decision on whether to open or close the transistor. By synchronizing the switching events with the external clock, noise from voltage regulator occurs at the same time as noise in other parts of the electronic device. This synchronization can create some minor latency, but provides time domain noise control.

The implementation describe above illustrated operation of the voltage regulator to provide a non-zero positive output current at a specified output voltage. However, another implementation of the voltage regulator would permit the regulator to sink current while regulating an output voltage by removing excess charge on the output capacitor. In this implementation, the conduction cycles could be initiated by detecting when the output voltage exceeds a nominal value. The turn-off for the transistors are determined analogously by negative current limits and voltage comparisons.

What is claimed is:

1. A voltage regulator having an input terminal to be coupled to an input voltage source and an output terminal to be coupled to a load, comprising:
   a first switch to intermittently couple the output terminal to the input terminal;
   a voltage sensor to detect a voltage at the output terminal;
   a current sensor to detect a current flowing between the input terminal and the output terminal;
   a controller connected to the switch, the voltage sensor and the current sensor, wherein the controller is configured to close the first switch if the voltage is less than a first threshold voltage and the current is less than a first threshold current, and the controller is configured to open the first switch if the voltage is greater than a second threshold voltage and the current is greater than a second threshold current.

2. The voltage regulator of claim 1, wherein the first threshold current is greater than the second threshold current.

3. The voltage regulator of claim 1, wherein the first threshold voltage is equal to the second threshold voltage.

4. The voltage regulator of claim 1, wherein the first threshold current is greater than the second threshold current.

5. The voltage regulator of claim 1, wherein the controller receives a clock signal from an external clock, and is further configured to delay switching of the first switch until a clock boundary on the external clock.

6. The voltage regulator of claim 1, further comprising a second switch to intermittently couple the output terminal to ground.

7. The voltage regulator of claim 6, wherein the controller is configured to open the second switch if the first switch closes or the current is less than a third threshold current.

8. The voltage regulator of claim 6, wherein the third threshold current is about zero current.

9. The voltage regulator of claim 7, wherein the controller is configured to open the first switch and close the second switch if the first switch has been open for longer than a first duration.

10. The voltage regulator of claim 9, wherein the controller is configured to open the first switch and close the second switch if the first switch has been open for longer than a first duration and the voltage exceeds the second threshold voltage.

11. The voltage regulator of claim 1, wherein the controller is configured to open the first switch if the current is greater than a fourth threshold current.

12. The voltage regulator of claim 11, wherein the fourth threshold current is approximately equal to a nominal maximum load current plus a ripple current.

13. The voltage regulator of claim 1, wherein the controller is configured to close the first switch for a minimum first duration.

14. The voltage regulator of claim 1, further comprising a filter in a circuit path between the input terminal and the output terminal.

15. The voltage regulator of claim 14, wherein the filter includes an inductor coupling the intermediate terminal to the output terminal, and a capacitor coupling the output terminal to ground.

16. A voltage regulator having an input terminal to be coupled to an input voltage source and an output terminal to be coupled to a load, comprising:
   a first switch to intermittently couple the output terminal to the input terminal;
   a voltage sensor to detect a voltage at the output terminal;
   a current sensor to detect a current flowing between the input terminal and the output terminal;
   a controller connected to the switch, the voltage sensor and the current sensor, wherein the controller is configured to close the first switch if the voltage is less than a first threshold voltage and the current is less than a first threshold current, and the controller is configured to open the first switch if the voltage is greater than the first threshold voltage and the current is greater than a second threshold current, the first threshold current being greater than the second threshold current.

17. A voltage regulator having an input terminal to be coupled to an input voltage source and an output terminal to be coupled to a load, comprising:
   a) a first switch to intermittently couple the output terminal to the input terminal;
   b) a voltage sensor to detect a voltage at the output terminal;
   c) a current sensor to detect a current flowing between the input terminal and the output terminal; and
   d) a controller connected to the switch, the voltage sensor and the current sensor, wherein the controller is configured to
      i) direct current pulses of a fixed amplitude to the output terminal if the current load is less than a first threshold, ii) direct current pulses of increasing amplitude to the output terminal if the current load is between the first threshold and a second threshold, and iii) permit current to flow continuously to the output terminal if the current load is greater than the second threshold.

18. A method of operating a voltage regulator having an input terminal to be coupled to an input voltage source and an output terminal to be coupled to a load, comprising:

determining a voltage at the output terminal;

determining a current flowing through a circuit path between the input terminal and the output terminal;

closing a switch to electrically couple the output input terminal to the input terminal if the voltage is less than a first threshold voltage and the current is less than a first threshold current; and opening the switch if the voltage is greater than a second threshold voltage and the current is greater than a second threshold current.

19. The method of claim 18, wherein the first threshold current is greater than the second threshold current.

20. The method of claim 18, wherein the first threshold voltage is equal to the second threshold voltage.

21. The method of claim 18, wherein the first threshold current is greater than the second threshold current.

* * * * *